May 3, 1960 F. W. MARTIN ET AL 2,935,164
POWER BRAKING SYSTEM
Filed June 12, 1958
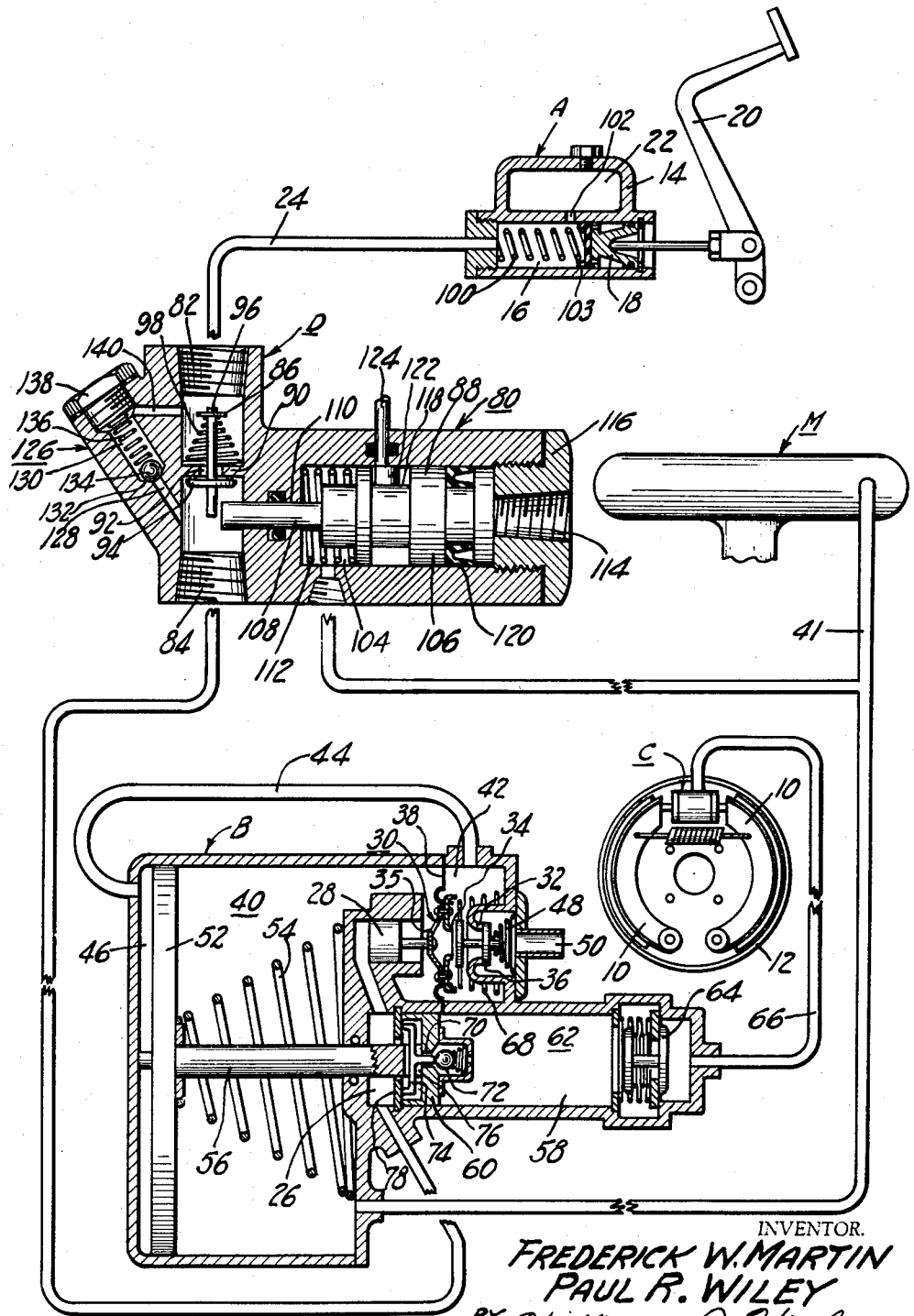
INVENTOR.
FREDERICK W. MARTIN
PAUL R. WILEY
BY William P. Hickey
ATTORNEY United States Patent Office 2,935,164
Patented May 3, 1960

2,935,164

POWER BRAKING SYSTEM

Frederick W. Martin, South Bend, Ind., and Paul R. Wiley, Florissant, Mo., assignors to Bendix Aviation Corporation, South Bend, Ind., a corporation of Delaware Application June 12, 1958, Serial No. 741,564

6 Claims. (Cl. 188—152)

The present invention relates to hydraulic systems of the type employing a servomotor driven fluid pressure intensifying unit which receives a hydraulic input signal from a primary fluid pressurizing device and which discharges a quantity of fluid which is proportionately greater than the quantity of its pressure fluid inlet signal; and more particularly to automotive hydraulic braking systems of the above mentioned type.

An object of the invention is the provision of a new and improved low input power actuated hydraulic braking system of the above mentioned type which is reliable and can be safely actuated both normally and on power failure with a minimum of operator movement.

Another object of the present invention is the provision of a hydraulic system of the above mentioned type wherein: the discharge of the primary fluid pressurizing device can be communicated directly to the discharge of the servomotor driven intensifying unit when fluid pressure differential is not available to drive its servomotor; the intensifying unit has a greater quantity of output than input when power driven, and the primary fluid pressurizing device has a capacity just sufficient to actuate the servomotor driven intensifying unit; and check valve means are provided between the primary fluid pressurizing device and the servomotor driven intensifying unit that is held open when fluid pressure differential is available to actuate the servomotor and which is closed when fluid pressure is not available to actuate the servomotor.

The invention resides in certain constructions, and combinations and arrangements of parts and further objects and advantages will become apparent to those skilled in the art to which the invention relates from the following description of the preferred embodiment described with reference to the accompanying drawing forming a part of this specification.

The solitary figure of the drawing shows an automotive hydraulic braking system incorporating principles of the present invention.

While the invention may be otherwise embodied, it is herein shown and described as embodied in an automotive hydraulic braking system of the type having a primary fluid pressurizing device or master cylinder A whose discharge is communicated to a fluid pressure servomotor driven hydraulic pressure intensifying unit B whose hydraulic output is proportionately greater than its input signal, and which output is communicated to a driven fluid pressure motor or wheel cylinder C which forces a pair of brake shoes 10 into engagement with their brake drum 12.

The system as set forth above generally describes one form of power operated hydraulic braking system used in truck and automotive vehicles being built today. The master cylinder A shown is of conventional design and comprises a casting 14 having a suitable fluid pressurizing chamber 16 therein from which fluid is displaced by means of a displacement plunger 18. Displacement plunger 18 is stroked by a foot pedal lever 20, and the casting 14 is also provided with a reservoir chamber 22 which holds a reserve of hydraulic fluid that can be used to compensate for fluid volume changes in the system due to thermal expansion etc.

The discharge from the master cylinder A is communicated to the follow-up chamber 26 of the servomotor driven fluid pressure intensifying unit B through the conduit 24. Pressure from the follow-up chamber 26 is communicated to the back side of a hydraulic piston 28 in the end casting of the servomotor unit B, which piston 28 is used to actuate the control valve structure 30 of the servomotor unit. The control valve structure 30 comprises axially aligned atmospheric and vacuum valve seats, 32 and 34 respectively, air flow past which can be simultaneously controlled by means of a spool-shaped poppet member 36 whose respective end flange portions are adapted to abut the valve seats 32 and 34 respectively. The atmospheric valve seat 32 is integrally cast in one end of the servomotor structure, and the vacuum valve seat 34 is carried by a flexible diaphragm structure 38 which separates the front power chamber 40 of the servomotor structure from the control chamber 42 of the control valve structure 30. A supply of vacuum, as for example that obtained from the manifold M of the vehicle's propelling engine, is continuously communicated to the front power chamber 40 of the servomotor by conduit 41; and in the normal condition of the servomotor unit B, vacuum is communicated past the vacuum valve seat 34 to the control chamber 42 and thence through conduit 44 to the rear power chamber 46 of the servomotor unit B. Hydraulic piston 28 is connected to the vacuum valve seat 34 by a rigid spider 35; and upon pressure being supplied to the follow-up chamber 26 from the control means A, the vacuum valve seat 34 will be forced into sealing abutment with the rear flange of the spool-shaped poppet member 36 to close off further communication between the front and rear power chambers 40 and 46 respectively. Further increase in pressure in the follow-up chamber 26 causes the valve closure spring 48 to be compressed, and the front flange of the poppet member 36 to be lifted from engagement with the atmospheric valve seat 32 to thereby permit air to flow through the tube 50, past the valve seat 32, to the rear power chamber 46 of the servomotor unit.

The power piston 52 separating the front and rear power chambers 40 and 46 respectively is biased into its retracted or most rearwardly position by means of a piston return spring 54; and upon a flow of air to the rear power chamber 46, the piston 52 will be forced forwardly to compress the piston spring 54 and force its piston rod 56 into the hydraulic chamber 58 of the fluid intensifying unit B. The hydraulic chamber 58 contains a hydraulic piston 60 which separates its follow-up chamber 26 from its fluid pressurizing chamber 62; and upon forward movement of the piston rod 56, the hydraulic piston 60 is forced forwardly to displace fluid from the fluid pressurizing chamber 62. Fluid displaced from the fluid pressurizing chamber 62 passes through a conventional residual pressure check valve structure 64, thence through a discharge conduit 66 to the fluid pressure motor C of the vehicle's brake mechanism. Residual pressure check valve structure 64 functions to always maintain a slight positive pressure in the discharge connection 66; and for a more complete understanding of its construction and operation, reference may be had to the Earl R. Price Patent No. 2,402,344. In the normal deenergized condition of the braking system shown in the drawing, the vacuum valve seat 34 will normally be held out of engagement with the spool-shaped poppet member 36 by the coil spring 68, so that vacuum which is continually communicated with the front power chamber 40 will also be communicated with the rear power chamber 46 of the servomotor unit.

The fluid pressure intensifying unit B is of the type which will permit its input signal to be communicated directly with its discharge without moving any of its power driven elements upon a failure in the vacuum supply to the servomotor unit; and accordingly its hydraulic piston 60 is provided with a flow passage 70 therethrough which is adapted to be closed off by a ball check structure 72. The ball check valve structure 72 is positioned adjacent the forward face of the hydraulic piston 60 so that pressure generated within the fluid pressurizing chamber 62 will cause the ball check valve structure 72 to close off the flow passage 70. In the normal de-energized condition of the pressure intensifying unit B, the ball check valve structure 72 will be held in an open position by means of a wishbone-shaped abutment structure 74 which projects through the passageway 70 and lifts the ball check structure 72 out of engagement with the front face of the hydraulic piston 60. The wishbone structure 74 is loosely carried in a milled slot 76 in the end of the piston rod 56; and in the retracted position of the piston rod, the rear end of the wishbone structure 74 abuts a fixed ring 78 to cause the wishbone structure 74 to open the ball check structure 72. For a more complete understanding of the construction and operation of the pressure intensifying unit B shown in the drawing, reference may be had to the E. J. Ringer Patent No. 2,598,604.

Operation of the system so far described will be initiated by depressing of the foot pedal lever 20, whereupon fluid pressure generated in the fluid pressurizing chamber 16 of the master cylinder A will be communicated through the line 24 to the follow-up chamber 26 of the servomotor driven fluid pressure intensifying unit B. An increase in hydraulic pressure in the follow-up chamber 26 causes the hydraulic piston 28 to move the vacuum valve seat 34 into engagement with the spool-shaped poppet member 36, and thereby isolate the rear power chamber 46 from the front power chamber 40. Further forward movement of the hydraulic piston 28 causes the front flange of the spool-shaped poppet member 36 to be lifted from the atmospheric valve seat 32 to thereafter communicate air pressure to the rear power chamber 46 to drive the power piston rod 56 forwardly into the hydraulic chamber 58.

Initial forward movement of the piston rod 56 as produced during a power actuation of the pressure intensifying unit B permits the wishbone structure 74 to move rearwardly relative to the piston 60 and the ball check valve structure 72 to close. Thereafter forward movement of the hydraulic piston 60 causes fluid to be displaced from the fluid pressurizing chamber 62 which then proceeds to the wheel cylinder C to actuate the brake structure of the vehicle. Actuation of the servomotor unit B will continue until such time as the air bled into the control chamber 42 develops a pressure differential across the diaphragm 38 just sufficient to oppose the hydraulic pressure upon its actuating piston 28; whereupon the valve structure moves rearwardly to permit the front flange of the spool shaped poppet member 36 to again abut the atmospheric valve seat 32. Thereafter further change in pressure differential across the power piston 52 is prevented, and this in turn prevents further increase in pressure in the fluid pressurizing chamber 62.

A retraction of the foot pedal lever 20 will, of course, permit a reduction of pressure behind the piston 28 so that the vacuum valve seat 34 will move rearwardly out of engagement with the spool-shaped poppet member 36 and thereby reduce the pressure within the rear power chamber 46 of the servomotor B. Should the foot pedal lever 20 be only partially retracted, the pressure within the control chamber 42 will be reduced by an amount permitting the vacuum valve seat 34 to again abut the spool-shaped poppet member 46 and thereby cause the control valve structure 30 to again be lapped at a degree of servomotor energization corresponding with the input signal being supplied to its follow-up chamber 26. A complete retraction of the foot pedal lever 20 will, of course, permit the vacuum valve seat 34 to be biased completely out of engagement with the spool-shaped poppet member 36 by the coil spring 68 so that a complete retraction of the power piston 52 will again take place. As the hydraulic piston 60 again approaches its retracted position adjacent the fixed ring 78, the wishbone structure 74 will again be forced through the passage 70 to open the ball check valve structure 72 and thereafter permit communication between the follow-up chamber 26 and the fluid pressure chamber 62.

One important application of applicants' invention will be found in braking systems for trucks wherein the quantity of fluid which must be supplied to its brake applying fluid pressure motor C is quite large; and is so large in fact, that a master cylinder A having sufficient displacement to operate the system with one stroke of the foot pedal lever 20 requires so much force to operate that an operator cannot develop sufficient pressure to adequately brake the vehicle. In truck braking systems of this size and capacity, power failure of the servometer unit B is a rather serious occurrence; since the operator, no matter how hard he pushes, cannot adequately stop the vehicle.

According to principles of the present invention, it is desired to use a master cylinder A of a capacity substantially no larger than required to operate the system when power is available to actuate its fluid pressure servomotor intensifying unit B. The system will preferably include a servomotor driven intensifying unit B so constructed and arranged that the quantity of fluid which is displaced from its fluid pressurizing chamber 62 will be considerably larger than the capacity of its follow-up chamber 26, and the master cylinder A will then be sized to provide a displacement equal to or just slightly larger than the displacement of the follow-up chamber 26. By way of example, one embodiment of applicants' braking system for large tractor-trailer vehicles whose wheel cylinders require a capacity of approximately 3 cubic inches to operate would utilize a fluid pressure servomotor driven fluid pressure intensifying unit B having a fluid pressurizing chamber 62 of a displacement of approximately 3.2 cubic inches, and a piston rod 56 of such a diameter as to provide a displacement for its follow-up chamber 26 of approximately 1 cubic inch. Such a system would preferably be operated by means of a standard master cylinder A having a displacement of or just exceeding 1 cubic inch so that the system can be completely power actuated with one stroke of the foot pedal lever 20. Upon power failure of such a system, however, it will be apparent that one stroke of the foot pedal lever 20 will not be capable of providing the 3 cubic inches of fluid necessary to operate the braking system; and according to further principles of the present invention means D will be provided which will permit the brake lever 20 to be retracted and then restroked to supply additional displacement to the wheel cylinder C which will add to the fluid previously displaced by the master cylinder to provide a total quantity sufficient to operate the braking system. It will be apparent that one of the major advantages of such a system is that the smaller master cylinder A of the present system can supply a hydraulic output of an intensity approximately three times that of the type of master cylinder previously used to operate such a system so that a considerably greater and quite adequate manual application of the braking system can now be obtained. It will further be apparent that the means D must be positively acting and foolproof inasmuch as it is an integral part of the braking system and its failure would endanger the entire braking system of the vehicle.

The means D shown in the drawing generally comprises a body member 80 having an inlet and outlet connection 82 and 84 respectively into which segments of the line 24 are connected. The means D further includes a tiltable check valve structure 86 positioned between the inlet 82 and outlet 84 in such manner as to permit flow from the master cylinder A to the servomotor intensifying unit B, and to prevent flow in the reverse direction from the intensifying unit B to the master cylinder A. The means D further includes a fluid pressure operated motor 88 which is supplied with the same pressure differential that is supplied to the servomotor unit B, and which is so constructed and arranged as to hold the check valve structure 86 open so long as power is available to operate the servomotor portion of the unit B.

The check valve structure 86 is of the type shown in the Earl R. Price Patent No. 2,683,352 and is formed by means of a partition wall 90 positioned between the inlet and outlet connections 82 and 84 respectively, and through which a flow passage 92 passes. A poppet member 94 having a stem 96 is positioned adjacent the outlet side of the partition wall 90 so that the upper end of the stem 96 extends through the opening 92 and projects above the other side of the partition wall 90. A coil spring 98 is positioned adjacent the upper end of the partition 90, and a retainer is fixed to the upper end of the stem 96 so that the poppet member 94 is normally held into engagement with the lower surface of the partition 90. It will be apparent that with the check valve structure 86 in the position shown in the drawing, fluid from the master cylinder A is free to pass through the check valve structure to the servomotor intensifying unit B, but that flow in the reverse direction from the intensifying unit B to the master cylinder A will be prevented. In this position of the check valve structure 86, therefore, fluid displacement from the master cylinder A will open the check valve structure and be delivered to the intensifying unit B, and will be prevented from returning to the master cylinder A upon a retraction of the foot pedal lever 20. The master cylinder A includes a coil spring 100 of sufficient strength to force the displacement member 18 rearwardly and create sufficient negative pressure in the chamber 16 to cause fluid flow through the compensating port 102 and past the piston seal 103. A fresh supply of fluid from the reservoir 22 is thereby caused to enter the fluid pressurizing chamber 16, and a restroking of the foot pedal lever 20 causes this additional quantity of fluid to be forced past the check valve structure 86 and to be added to that previously delivered to the follow-up chamber 26 of the intensifying unit B. If the truck's braking system has but a small amount of clearance between its brake shoes and drums, the second application of foot pedal lever 20 may be enough to produce a manual application during power failure. It will be remembered that during power failure, the wishbone 74 holds the check valve structure 72 in the hydraulic piston 60 of the intensifying unit B open so that the displacement of the master cylinder A is free to flow directly to the discharge of the fluid pressure intensifying unit B. If the condition of the truck's brakes is such as to require a full 3 cubic inches of displacement in order to be operated, a second retraction of the foot pedal lever will add a third cubic inch of displacement to the truck's braking system so that a complete braking application of the vehicle will then be had. It will be apparent that the check valve structure 86 is quick and positively acting, so that substantially no return flow is experienced from the fluid pressure intensifying unit B to the master cylinder A during each restroking of the foot pedal lever 20.

As previously indicated, when fluid pressure differential is available to actuate the servomotor portion of the unit B, fluid pressure motor 88 will hold the check valve structure 86 open so that flow can be experienced in both directions between the master cylinder A and the servomotor fluid pressure intensifying unit B. The fluid pressure motor 88 shown in the drawing is formed by means of a chamber 104 in the body member 80 which is at substantially right angles to the check valve structure 86. The piston 106 is positioned in the chamber 104 for reciprocatory movement therein, and an axially extending pin 108 is formed integrally on the piston assembly 106 and projects through an opening 110 in the body member 80 for engagement with the lower end portion of the stem 96 of the check valve structure 86. A coil spring 112 is positioned between the bottom end of the chamber 104 and the piston 106 to normally hold the pin 108 out of engagement with the stem 96 of the check valve structure to permit the check valve structure to normally be in its closed position. Vacuum from the manifold M of the truck's propelling engine is communicated to the inner end of the piston assembly 106 while atmospheric pressure is communicated to the outer end of the piston assembly 106 through a suitable opening 114 in end closure nut 116. The spring 112 is so designed as to hold the stem 106 away from the check valve structure 86 whenever insufficient pressure differential is available to provide a satisfactory power application of the servomotor portion of the unit B. When the pressure differential exceeds this generally predetermined amount, the pin 108 of the piston assembly 106 will be moved inwardly to engage the stem 96 of the check valve structure 86 to tilt the poppet member 94 out of sealing engagement with the outlet side of the partition 90, and free communication is thereby provided in both directions through the opening 92. The piston assembly 106 is provided with an annular recess 118 inwardly of its seal 120 for the reception of a cam member 122 having a shaft 124 which extends outwardly of the body member 80 so that the stem 108 can be moved inwardly to open the check valve structure 86 manually when insufficient pressure differential is available to operate the piston assembly 106. This makes possible a release of the braking system during power failure when the check valve structure 86 remains closed, and each stroke of the foot pedal lever 20 adds fluid to the servo fluid pressure intensifying unit B. In the system above described, a manual application of the brakes of the truck will be considered an emergency condition in which the means D will serve to hold the brakes applied until such time as the operator locates the trouble and desires to release his brakes; whereupon a rotation of a shaft 124 will permit fluid return to the master cylinder A through the check valve structure 86 to effect a release of the truck's brakes.

The means D may also, but not necessarily, include a relief valve structure 126 for relieving pressure from the outlet side of the check valve structure 86 back to the master cylinder A. The relief valve structure 126 shown in the drawing is formed by means of an angularly disposed drilling 128 in the body member 80 which opens into the outlet connection 84 of the body member 80. The drilling 128 is counterbored, as at 130, adjacent its outer end to provide a valve seat 132 against which a ball 134 is biased by a coil spring 136. The coil spring 136 is held in position by a threaded closure nut 138, and a transverse drilling 140 communicates the counterbore 130 with the inlet connection 82 of the body member 80.

The relief valve structure 126 may function in one of two ways about to be described. In the first mode of operation, the coil spring 136 of the relief valve structure 126 may be sized to hold the relief valve structure closed until the pressure at which the brake shoes 10 are held into engagement with their drum 12 is exceeded. During power failure, such an arrangement would permit the master cylinder A to be restroked to adequately brake the vehicle, and would permit all but a predetermined amount of braking effort to be released when the operator removes his foot from the foot pedal lever 20; so that the operator could release some of the braking effort which he applied during an emergency, if he so desired, to keep better control of his vehicle. When the vehicle is stopped and the trouble located, the operator can release the brakes manually by rotating the shaft 124.

In the second mode of operation, spring 136 of the check valve structure 126 is sized so as to cause the relief valve structure to open at a pressure just below that at which the brake shoes engage the brake drums. For example, engagement of the vehicle's brake shoes and drums may occur at a pressure of approximately 150 p.s.i., and the relief valve structure may be arranged to open at a pressure of approximately 125 p.s.i. With such an arrangement only a small amount of back flow to the master cylinder A will be experienced during each restroking of the master cylinder, so that the major percentage of its displacement will be delivered to the intensifying unit B during each stroke of the foot pedal lever 20, while at the same time eliminating dragging of the vehicle's brakes whenever the foot pedal lever 20 is retracted. By means of this arrangement, a type of self adjusting feature is provided for maintaining a generally predetermined amount of clearance between the brake shoes and drums, which will permit the truck's brakes to be manually actuated during the first or at most second stroke of its brake pedal lever.

It will be apparent that the objects heretofore enumerated as well as others have been accomplished, and that there has been provided a new and improved power operated braking system of the low input type which can be power actuated with a minimum of foot pedal lever movement, and which is also capable of being actuated manually with a minimum of effort by means of a pumping action that is positive and foolproof.

While the invention has been described in considerable detail, we do not wish to be limited to the particular construction shown and described, it is our intention to cover hereby all novel adaptations, modifications and arrangements thereof which come within the practice of those skilled in the art to which the invention relates, and which come within the scope of the following claims.

We claim:

1. In an automotive hydraulic braking system and the like: a driven fluid pressure motor of predetermined displacement, a fluid pressure servomotor driven hydraulic pressure intensifying unit of the type constructed and arranged to intensify a hydraulic input signal, said driven fluid pressure motor being supplied with the hydraulic output of said hydraulic pressure intensifying unit, a source of fluid pressure differential for operating said fluid pressure servomotor, a manually actuatable hydraulic pressure modulating device the pressure discharge of which is communicated to and controls said hydraulic pressure intensifying unit, said manually actuable modulating device having a displacement which is a fraction of that of said driven motor, said hydraulic pressure intensifying unit being of the type which when servomotor driven delivers a greater quantity of output fluid to said driven motor than is received from said modulating device, means for communicating the discharge of said manually actuatable fluid pressure modulating device to said driven fluid pressure motor when said fluid pressure differential is not available to actuate said servomotor, a normally closed check valve operatively interpositioned between said modulating device and said intensifying unit for permitting flow from said modulating device to said intensifying unit and for preventing flow from said intensifying unit to said modulating device when said check valve is in its closed position, and a fluid pressure motor subjected to said source of fluid pressure differential for holding said normally closed check valve open when said source of fluid pressure differential exceeds a generally predetermined level.

2. In an automotive hydraulic braking system and the like: a driven fluid pressure motor of predetermined displacement, a fluid pressure servomotor driven fluid pressure intensifying unit of the type constructed and arranged to intensify a hydraulic input signal, said driven fluid pressure motor being supplied with the hydraulic output of said fluid pressure intensifying unit, a source of fluid pressure differential for operating said fluid pressure servomotor, a manually actuatable fluid pressure modulating device the pressure discharge of which is communicated to and controls said fluid pressure intensifying unit, said manually actuable modulating device having a displacement which is a fraction of that of said driven motor, said fluid pressure intensifying unit being of the type which when servomotor driven delivers a greater quantity of output fluid to said driven motor than is received from said modulating device, means for communicating the discharge of said manually actuatable fluid pressure modulating device to said driven fluid pressure motor when said fluid pressure differential is not available to actuate said servomotor, a normally closed check valve operatively interpositioned between said modulating device and said intensifying unit for permitting flow from said modulating device to said intensifying unit and for preventing flow from said intensifying unit to said modulating device when said check valve is in its closed position, a fluid pressure motor subjected to said source of fluid pressure differential for holding said normally closed check valve open when said source of fluid pressure differential exceeds a generally predetermined level, and manually operable means for opening said check valve.

3. In an automotive hydraulic braking system and the like: a brake comprising a pair of opposing friction surfaces, a driven fluid pressure motor of predetermined displacement which causes said surfaces to engage each other when said motor is supplied with a predetermined pressure, a fluid pressure servomotor driven fluid pressure intensifying unit of the type constructed and arranged to intensify a hydraulic input signal, said driven fluid pressure motor being supplied with the hydraulic output of said fluid pressure intensifying unit, a source of fluid pressure differential for operating said fluid pressure servomotor, a manually actuatable fluid pressure modulating device the pressure discharge of which is communicated to and controls said fluid pressure intensifying unit, said manually actuable modulating device having a displacement which is a fraction of that of said driven motor, said fluid pressure intensifying unit being of the type which when servomotor driven has an input capacity approximately equal to that of said manually actuable modulating device and an output capacity approximately equal to that of said driven motor, means for communicating the discharge of said manually actuatable fluid pressure modulating device to said driven fluid pressure motor when said fluid pressure differential is not available to actuate said servomotor, a normally closed check valve operatively interpositioned between said modulating device and said intensifying unit for permitting flow from said modulating device to said intensifying unit and for preventing flow from said intensifying unit to said modulating device when said check valve is in its closed position, a fluid pressure motor subjected to said source of fluid pressure differential for holding said normally closed check valve open when said source of fluid pressure differential exceeds a generally predetermined level, and a pressure relief valve for relieving pressures above approximately said generally predetermined amount from the intensifying unit side of said check valve to the modulating device side of said check valve.

4. In an automotive hydraulic braking system and the like: a brake mechanism having a brake shoe and a brake drum which require a generally predetermined amount of force to cause said shoe to engage and develop braking effort with said brake drum, a driven fluid pressure motor for forcing said shoe into engagement with said drum, a fluid pressure servomotor driven hydraulic pressure intensifying unit of the type which when servomotor driven delivers a greater quantity of fluid output than the quantity of the fluid pressure input signal which it receives, the output of said unit being communicated to said driven motor, a source of fluid pressure differential for operating said fluid pressure servomotor, a master cylinder of predetermined displacement the pressure discharge of which is communicated to and supplies the pressure input signal for said fluid pressure intensifying unit, means for communicating the discharge of said master cylinder to said driven fluid pressure motor when fluid pressure differential is not available to actuate said servomotor, a normally closed check valve the inlet of which communicates with said master cylinder and the outlet of which communicates with said intensifying unit and last mentioned means, said check valve permitting flow from its inlet to its outlet and preventing flow from its outlet to its inlet when in its normal position, a fluid pressure motor subjected to said source of fluid pressure differential for holding said normally closed check valve open when the intensity of said fluid pressure source exceeds a generally predetermined level, said brake mechanism requiring a quantity of fluid to be delivered to said driven fluid pressure motor to cause said shoe to engage said drum with brake applying force which is greater than the displacement of said master cylinder, and manually controlled means for positively opening said check valve.

5. In an automotive hydraulic braking system and the like: a brake mechanism having a brake shoe and a brake drum which require a generally predetermined amount of force to cause said shoe to engage and develop braking effort with said brake drum, a driven fluid pressure motor of generally predetermined displacement requiring a generally predetermined inlet pressure for forcing said shoe into engagement with said drum, a fluid pressure servomotor driven hydraulic pressure intensifying unit of the type which when servomotor driven delivers a greater quantity of fluid output than the quantity of the fluid pressure input signal which it receives, the output of said unit being communicated to said driven motor, a source of fluid pressure differential for operating said fluid pressure servomotor, a master cylinder of predetermined displacement the pressure discharge of which is communicated to and supplies the pressure input signal for said fluid pressure intensifying unit, means for communicating the discharge of said master cylinder to said driven fluid pressure motor when fluid pressure differential is not available to actuate said servomotor, a normally closed check valve the inlet of which communicates with said master cylinder and the outlet of which communicates with said intensifying unit and last mentioned means, said check valve permitting flow from its inlet to its outlet and preventing flow from its outlet to its inlet when in its normal position, a fluid pressure motor subjected to said source of fluid pressure differential for holding said normally closed check valve open when the intensity of said fluid pressure source exceeds a generally predetermined level, said brake mechanism requiring a quantity of fluid to be delivered to said driven fluid pressure motor to cause said shoe to engage said drum which is greater than the displacement of said master cylinder, and a pressure relief valve for relieving pressure from the outlet side of said check valve to its inlet side, said relief valve being set to relieve pressures above approximately said predetermined inlet pressure at which said driven motor causes said shoe to engage said drum.

6. In an automotive hydraulic braking system and the like: a brake mechanism having a brake shoe and a brake drum which require a generally predetermined amount of force to cause said shoe to engage and develop braking effort with said brake drum, a driven fluid pressure motor for forcing said shoe into engagement with said drum, a fluid pressure servomotor driven hydraulic pressure intensifying unit of the type which when servomotor driven delivers a greater quantity of fluid output than the quantity of the fluid pressure input signal which it receives, the output of said unit being communicated to said driven motor, a source of fluid pressure differential for operating said fluid pressure servomotor, a master cylinder of predetermined displacement the pressure discharge of which is communicated to and supplies the pressure input signal for said fluid pressure intensifying unit, means for communicating the discharge of said master cylinder to said driven fluid pressure motor when fluid pressure differential is not available to actuate said servomotor, a normally closed check valve the inlet of which communicates with said master cylinder and the outlet of which communicates with said intensifying unit and last mentioned means, said check valve permitting flow from its inlet to its outlet and preventing flow from its outlet to its inlet when in its normal position, a fluid pressure motor subjected to said source of fluid pressure differential for holding said normally closed check valve open when the intensity of said fluid pressure source exceeds a generally predetermined level, said brake mechanism requiring a quantity of fluid to be delivered to said driven fluid pressure motor to cause said shoe to engage said drum which is greater than the displacement of said master cylinder, a pressure relief valve for relieving pressure from the outlet side of said check valve to its inlet side at a pressure above said predetermined inlet pressure wherein said shoe engages said drum, and manually controlled means for positively opening said check valve, said relief valve being set to relieve pressure above the pressure at which said driven motor causes said shoe to engage said drum.

References Cited in the file of this patent
UNITED STATES PATENTS

| | | |
|---|---|---|
| 2,275,697 | Stelzer | Mar. 10, 1942 |
| 2,466,224 | Frank et al. | Apr. 5, 1949 |
| 2,598,604 | Ringer | May 27, 1952 |
| 2,805,737 | Griffin | Sept. 10, 1957 |